(12) United States Patent
Ravi et al.

(10) Patent No.: US 8,793,674 B2
(45) Date of Patent: Jul. 29, 2014

(54) COMPUTER-GUIDED HOLISTIC OPTIMIZATION OF MAPREDUCE APPLICATIONS

(71) Applicants: Nishkam Ravi, Lawrenceville, NJ (US); Jun Liu, Princeton, NJ (US); Srimat T. Chakradhar, Manalapan, NJ (US)

(72) Inventors: Nishkam Ravi, Lawrenceville, NJ (US); Jun Liu, Princeton, NJ (US); Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 200 days.

(21) Appl. No.: 13/622,048

(22) Filed: Sep. 18, 2012

(65) Prior Publication Data
US 2013/0097593 A1    Apr. 18, 2013

Related U.S. Application Data

(60) Provisional application No. 61/536,274, filed on Sep. 19, 2011.

(51) Int. Cl.
  *G06F 9/45*    (2006.01)
  *G06F 9/44*    (2006.01)
(52) U.S. Cl.
  CPC .............. *G06F 8/443* (2013.01); *G06F 8/433* (2013.01); *G06F 9/4428* (2013.01)
  USPC ........................... 717/158; 717/141; 717/148
(58) Field of Classification Search
  USPC .............................................. 717/136–167
  See application file for complete search history.

(56) References Cited

U.S. PATENT DOCUMENTS

| 6,289,506 | B1 * | 9/2001 | Kwong et al. | 717/148 |
| 7,788,657 | B2 * | 8/2010 | Wannamaker et al. | 717/158 |
| 8,239,847 | B2 * | 8/2012 | Yu et al. | 717/149 |
| 2006/0158354 | A1 * | 7/2006 | Aberg et al. | 341/50 |
| 2009/0271775 | A1 * | 10/2009 | Barsness et al. | 717/151 |

OTHER PUBLICATIONS

Ranger, C.; Raghuraman, R.; Penmetsa, A.; Bradski, G.; Kozyrakis, C., "Evaluating MapReduce for Multi-core and Multiprocessor Systems," High Performance Computer Architecture, 2007. HPCA 2007. IEEE 13th International Symposium, pp. 13-24.*
Pham, H.; Paluska, J.M.; Saif, U.; Stawarz, C.; Terman, C.; Ward, S., "A dynamic platform for runtime adaptation," Pervasive Computing and Communications, 2009. PerCom 2009. IEEE International Conference, pp. 1-10.*
McGeehan, J.P.; Burrows, D.F., "Large signal performance of feedback automatic gain control systems," Communications, Radar and Signal Processing, IEEE Proceedings, vol. 128, No. 2, pp. 110-117.*

* cited by examiner

*Primary Examiner* — Satish Rampuria
(74) *Attorney, Agent, or Firm* — Joseph Kolodka

(57) ABSTRACT

A method for compiler-guided optimization of MapReduce type applications that includes applying transformations and optimizations to JAVA bytecode of an original application by an instrumenter which carries out static analysis to determine application properties depending on the optimization being performed and provides an output of optimized JAVA bytecode, and executing the application and analyzing generated trace and feeds information back into the instrumenter by a trace analyzer, the trace analyzer and instrumenter invoking each other iteratively and exchanging information through files.

10 Claims, 3 Drawing Sheets

```
public static void main()
{
    ...
    jobConf.setNumMapTasks(num_map_tasks);
    jobConf.setNumReduceTasks(num_reduce_tasks);
    startTime = panaceaUtil.getCurrentTime();
    JobClient.runJob(jobConf);
    endTime = panaceaUtil.getCurrentTime();
    elapsedTime = startTime - endTime;
    panaceaUtil.printTraceEvent(elapsedTime);
    ...
}
```

```
Input: Input data set X; initial results R^(0); convergence
       threshold δ; no. of inner loop iterations N; outputCollector
Output: Final result R
Procedure Main()
   //.. same as Fig.5(a)
   while diff(R^(n+1), R^(n)) ≤ δ do
      //R^(n) is the result after iteration n
      Split X into partitions P;
      for P ∈ P do
         Map(P, outputCollector);
      end for
      Combine(P, outputCollector);
      Reduce(P, outputCollector);
      update R;
      potentially update X;
   end while
Procedure Map(< K, V >)
   //Store all incoming < Key, Value > pairs in list L
   L ←< K, V >;
   return;
Procedure MapWrap()
   init(myOutputCollector);
   for p =< K, V >∈ L do
      Map2(p, myOutputCollector);
   end for
Procedure Close()
   //new inner loop
   for i ← 1 to N do
      MapWrap();
      init(myOutputCollector1);
      for Y ∈ myOutputCollector do
         Combine(Y, myOutputCollector1); //original Combine
      end for
      init(myOutputCollector2);
      for Z ∈ myOutputCollector1 do
         Reduce(Z, myOutputCollector2); //original Reduce
      end for
      myOutputCollector2.dump(L); //dump contents into L
   end for
   for p =< K, V >∈ L do
      Map2(outputCollector);
   end for
Procedure Map2()
   body of original Map;
```

Fig. 2A

US 8,793,674 B2

COMPUTER-GUIDED HOLISTIC OPTIMIZATION OF MAPREDUCE APPLICATIONS

RELATED APPLICATION INFORMATION

This application claims priority to provisional application No. 61/536,274 filed Sep. 19, 2011, the contents thereof are incorporated herein by reference

BACKGROUND OF THE INVENTION

The present invention relates generally to large scale data parallel processing, and more particularly, to computer-guided holistic optimization of MapReduce applications.

MapReduce is a commonly used programming model for performing large scale data parallel computations on commodity server clusters. MapReduce API allows developers to specify data operations as map or reduce functions for data transformation and aggregation respectively. Actual mapping of data and code to the nodes in the distributed system is handled by the framework/runtime autonomously. Improving the runtime has, therefore, been an active area of research. HADOOP (HADOOP is a registered trademark of The Apache Software Foundation, Forest Hill, Md., USA) is the most popular open-source framework/runtime for MapReduce. It powers numerous web services including FACEBOOK, TWITTER, NETFLIX, AMAZON and YAHOO among others. (FACEBOOK is a registered trademark of Facebook, Inc., located in Palo Alto, Calif., USA.; TWITTER is a registered trademark of Twitter, Inc., located in San Francisco, Calif., USA.; AMAZON is a registered trademark of Amazon, Inc., located in Las Vegas, Nev., USA.; YAHOO is a registered trademark of Yahoo, Inc., located in Sunnyvale, Calif., USA.).

Despite advances in the underlying implementations of MapReduce (e.g HADOOP), the opportunities for optimizing the applications themselves remain largely unexplored. As mentioned before, map and reduce functions are the main building blocks of a MapReduce application and are defined by the developer. A better definition of these functions can lead to better performance. Although new APIs for improving performance get proposed every now and then, it is up to the developer to make use of these APIs. Since it requires deep understanding of the APIs as well as a lot of programming/debugging/testing effort on the part of the developer, oftentimes, performance improvement opportunities are missed by developers. We call these missed opportunities "performance bugs". In addition to the application code itself, the numerous parameters (more than 150 for HADOOP) that need to be tuned for a given cluster configuration, are often left unoptimized causing further performance degradation.

Applicants, to the best of their knowledge, are not aware of any prior work on automatically fixing performance bugs in MapReduce/HADOOP applications. So far, the focus has been on improving the runtime performance and proposing new library extensions/APIs to be used by developers. Other's efforts attempt at optimizing iterative MapReduce applications through library extensions and define APIs for writing iterative algorithms. In contrast, the inventive technique herein identifies and formulates a compiler optimization that is independent of the implementation of map and reduce functions and automatically transforms a legacy MapReduce application yielding up to 3x speedup without user involvement.

Accordingly, there is a need for a method for automatically fixing performance bugs in MapReduce/HADOOP applications.

BRIEF SUMMARY OF THE INVENTION

The present invention is directed to a method for compiler-guided optimization of MapReduce type applications that includes applying transformations and optimizations to JAVA bytecode of an original application by an instrumenter which carries out static analysis to determine application properties depending on the optimization being performed and provides an output of optimized JAVA bytecode, and executing the application and analyzing generated trace and feeds information back into the instrumenter by a trace analyzer, the trace analyzer and instrumenter invoking each other iteratively and exchanging information through files; wherein an automatic compiler transformation for a MapReduce data tiling optimization of the optimizations is completely independent of a body of map and reduce and can be applied to iterative convergence processes.

These and other advantages of the invention will be apparent to those of ordinary skill in the art by reference to the following detailed description and the accompanying drawings.

BRIEF DESCRIPTION OF THE DRAWINGS

FIG. 2A is a diagram of a MapReduce MR-blocking optimization with main transformation shown in blue, in accordance with the invention;

DETAILED DESCRIPTION

The present invention is directed to a method for an optimizing compiler for MapReduce applications that identifies and fixes performance bugs with little to no help from the developer. The inventive method is a domain-specific compiler-guided tool that performs source-to-source transformations. Unlike traditional compiler optimizations, which are local in scope, performance optimizations by the inventive method are holistic in nature. Currently, two optimizations have been implemented and experimented with. Evaluation of optimizations on a suite of MapReduce applications and the experimental results show performance gains of up to 3x.

The inventive method (also referred to herein as Panacea) combines static analysis with application trace analysis. Panacea is targeted towards HADOOP applications and developed on top of Soot, which is an open-source JAVA optimization framework. The optimizations are performed at the JAVA bytecode level.

Panacea consists of two key components: (i) Instrumenter and (ii) Trace Analyzer. Instrumenter applies transformations/optimizations to the JAVA bytecode of the original application and consists of several subcomponents, such as static analyzer, parameter instrumenter, trace instrumenter etc. Instrumenter carries out static analysis to determine application properties depending on the optimization being performed. However, due to the holistic nature of optimizations, use of runtime information is necessary. Trace Analyzer executes an application, analyzes the generated trace and feeds information back into the instrumenter. Instrumenter and Trace Analyzer invoke each other iteratively and exchange information through files. This is a key configuration feature of Panacea.

Figures 1A, 3A:
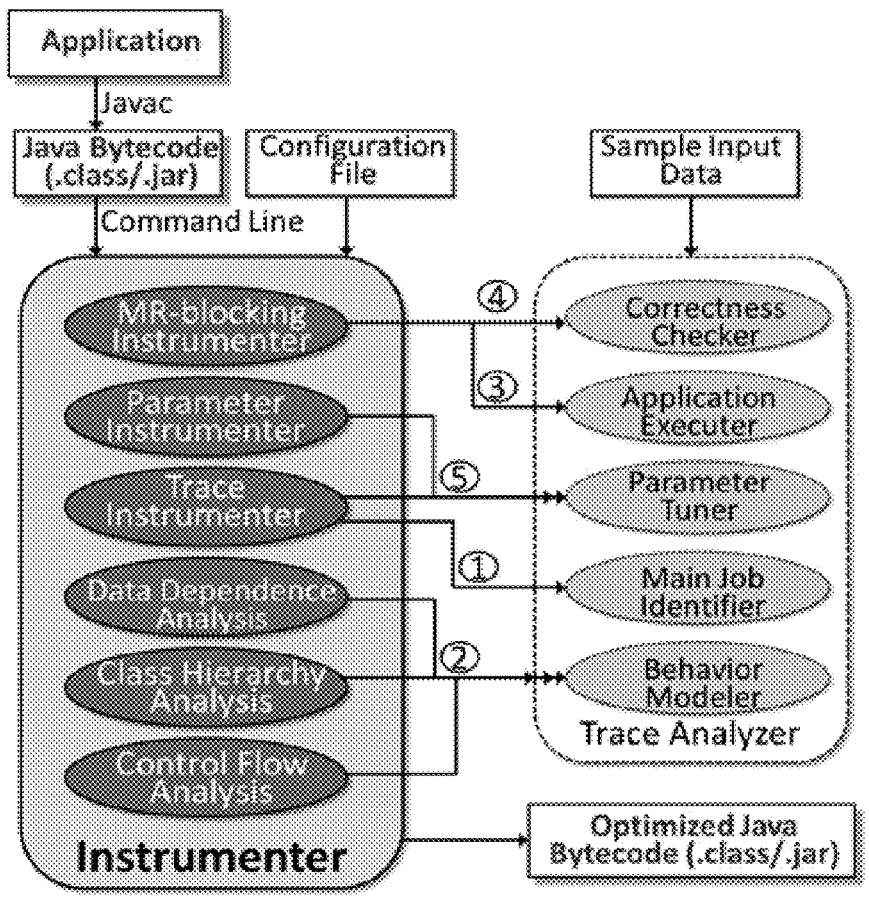
FIG. 1A is a diagram of an exemplary panacea configuration, in accordance with the invention is undertaken.
FIG. 3A shows code instrumentation for trace generation and parameter tuning, in accordance with the invention.

The diagram of FIG. 1A shows an exemplary panacea configuration in accordance with the invention. The Instrumenter, responsive to JAVA Bytecode from an application and a configuration file and outputs optimized JAVA Bytecode, includes MapReduce MR-blocking, a parameter instrumenter, a trace instrumenter, a data dependence analysis, class hierarchy analysis and control flow analysis. The Trace Analyzer, responsive to sample input data, includes a correctness checker, an application executer, a parameter tuner, a main job identifier and a behavior modeler. The Instrumenter invokes different aspects of the trace analyzer in the order of numbered paths 1-5, shown in FIG. 1A.

Looking now to numbered path 1 in FIG. 1A, the bytecode is instrumented with statements needed for trace generation. The Trace Analyzer is then invoked and the application is executed. The Trace Analyzer identifies the main job in the MapReduce application. This is done by comparing the total execution time of the different jobs and identifying the one which runs the longest.

Looking at numbered path 2 in FIG. 1A, once the main job is identified, basic legality checks are performed by the Instrumenter for the different optimizations. If successful, second round of instrumentation is applied for the purpose of doing additional legality checks. The trace analyzer is invoked again. If the legality conditions are met, the instrumenter is invoked.

The instrumenter applies MR-blocking optimization and invokes the Trace Analyzer to execute the application, see number path 3 in FIG. 1A. The trace analyzer executes the application and carries out correctness verification, see numbered path 4 in FIG. 1A.

Under numbered path 5 in FIG. 1A, if successful, code instrumentation for Parameter Auto-tuning is applied and Trace Analyzer is invoked. Trace analyzer performs parameter search and identifies optimal values, detailed more in FIG. 4A discussed herein below.

MapReduce Data Tiling Optimization

The optimization under the inventive method is designed for iterative convergence applications (such as clustering, social network analysis, etc) where a MapReduce job is performed repeatedly inside a while loop, such that an iteration refines the result obtained from the previous iteration, until a convergence criterion is satisfied. The final result is approximate, and accuracy can be traded for performance. The goal of this optimization is to reduce the data transfer and synchronization overhead between the various map and reduce tasks in the cluster. The data transfer and synchronization overhead is directly proportional to the number of iterations of the while loop. If the result could be made to converge faster, fewer iterations of the while loop would be needed. This can be accomplished by introducing an inner loop (in the body of map function) that applies the same algorithm to the set of input data points local to this particular map task before doing a global reduce. By performing map-reduce repeatedly inside map itself, the intermediate results get refined before they are transferred and reduced, thereby converging faster and minimizing the number of iterations of the outer while loop. There is an increase in the amount of work done locally with a net reduction in the amount of work done globally which includes data transfer and synchronization overheads.

Applicants have identified an automatic compiler transformation for this optimization that is completely independent of the body of map-and-reduce and, therefore, can be generally applied to iterative convergence algorithms. The process of FIG. 2A is the MR-blocking optimization with the main transformation shown in blue.

This transformation makes use of the close function in HADOOP, which is invoked once at the end of every map task (note that a map task invokes the map function multiple times once for each key/value pair in the input data set). The body of original map function is moved to map2. The new map function only stores the incoming key/value pairs in a list. A new method called map_wrapper is introduced, which invokes map2 on the key/value pairs stored in the list iteratively. Intuitively, map_wrapper is the behavioral equivalent of the original map function, except that it works on multiple key/value pairs at a time. A loop is introduced in close function, which invokes map_wrapper and reduce inside a loop.

In order to store the output produced by map_wrapper and pass it onto reduce, we define a new class called MyOutputCollector, which inherits from HADOOP's OutputCollector and mimics its behavior by defining a hashtable for storing the key/value pairs. Instead of passing an object of OutputCollector as a parameter to reduce inside the loop, an object of MyOutputCollector is passed.

This transformation accumulates the input data set and then applies the map function to multiple key/value pairs at a time. In order for the data tiling optimization to work correctly, it is important that multiple data elements be processed per map-reduce in the inner loop (introduced in the close method) so that the intermediate results obtained from these data points are robust. The transformation shown in is generic and does not require any explicit preprocessing of the input data set. Besides, since the input data file may contain complex data structures, preprocessing may not be possible for certain applications.

We require the developer/job-submitter to use a compiler flag -approximate to indicate that the application follows the iterative convergence model and that a certain loss of accuracy in the output is acceptable, in order to trigger this optimization. The tolerable loss in accuracy can be expressed as a fraction/percentage of the original result using another compile time flag: -error=e where e=5 implies that a 5% deviation/error is acceptable. The trace analyzer is responsible for enforcing correctness by comparing the results of the optimized version with that of the non-optimized version. Alternately, the developer/job-submitter can verify correctness by manually comparing the two results during the testing/debugging phase.

We have developed a variant of the data tiling optimization that is more conservative than the one described above. In this version, one or two iterations of the outer while loop are peeled and the data tiling optimization is applied to the remainder loop. This is a hybrid approach, where the original application logic is followed for one or two iterations and the optimized logic is followed for the remaining iterations till the convergence criterion is met. The advantage of applying loop peeling along with data tiling is that the accuracy of the final result is potentially better than the accuracy of the result obtained with data tiling alone. The disadvantage is that the performance gains are slightly lower. However, this allows us to trade accuracy for performance by changing the number of peeled iterations depending on the error threshold specified by the developer during invocation of the inventive technique, Panacea.

Parameter Auto-Tuning Optimization

For every HADOOP job, a job configuration object is created and the parameters of the job are specified through this object. HADOOP has more than 150 parameters of which at least 8-10 are critical for performance, such as number of map tasks, number of reduce tasks, etc. These are specified either by the developer or the job submitter. Carefully choosing the value of these parameters can be tedious.

The parameter tuning optimization is targeted towards automating this process to enhance programmer productivity and application performance. The parameter tuning optimization employs three key components: parameter instrumenter, trace instrumenter and trace analyzer. Trace instrumenter is responsible for instrumenting the application bytecode for selective trace generation. Parameter instrumenter is responsible for adding statements in the bytecode for setting parameter values. Trace analyzer is responsible for executing the application with a fixed set of parameters and measuring the execution time.

Figure 4A:
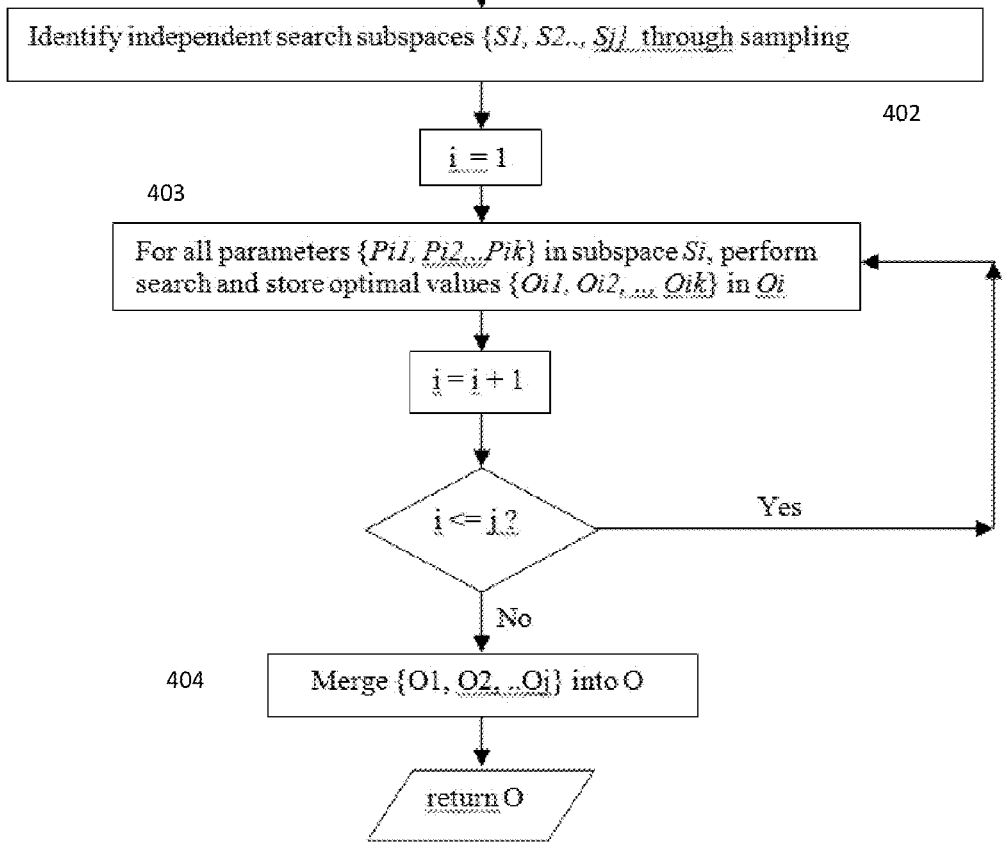
FIG. 4A is a flow diagram for a parameter search, in accordance with the invention.

FIG. 3A shows the instrumentation inserted by trace instrumenter and parameter instrumenter (in bolds and italicized bolds respectively). FIG. 4A shows a flow chart for key aspects of a parameter search in accordance with the invention. Initially, code instrumentation is inserted for all parameters 401, independent search subspaces are identified through sampling 402, a search is performed for all parameters in the subspace and optimal values are stored 403, and then optimal values from iterative searches are merged 404.

Parameter tuning optimization tries to find optimal values for a set of parameters such that the performance is maximized. Trace analyzer defines the range and increment for each parameter in order to define the search space. For example, number of map tasks for a given application can vary between 1 and (K*number of nodes*number of cores per node) with a constant increment of (number of cores per node). For a given set of parameters P1, P2, P3, . . . Pn, the trace analyzer picks a set of values V1, V2, V3, . . . Vn and invokes the parameter instrumenter which instruments the application with code for setting parameter values, such that P1=V1, P2=V2, . . . Pn=Vn, see 401 in FIG. 4A. The trace analyzer then executes the application and measures the time. This process is repeated for different values of the parameters. The combination that yields best performance is finally coded into the application.

The downside of an exhaustive search based tuning approach is that the search time can be dramatically high. In order to solve this problem, we identify subsets of parameters that can be searched independently. In this approach, the search space is broken down into smaller search subspaces, search is performed independently on each subspace and the final result is obtained by composing the results of the search performed on each subspace. The final result, though not as accurate as what exhaustive search would yield, is usually good enough for practical purposes. For example, if we are tuning four parameters P1, P2, P3, P4 such that (P1, P3), (P1, P4), (P2, P3) and (P3, P4) are semi-independent, we would search P1 and P2 together, and P3 and P4 together. We determine subsets of semi-independent parameters experimentally during a sampling phase that precedes the actual search. From our experiments, we find that most HADOOP parameters can be tuned independently or in sets of two's, as long as the values of the other parameters are initialized reasonably. The range of reasonable initial values for parameters can be determined statically based on the number of nodes in the cluster and number of cores per node. This approach allows us to cut the search time down from a few days to a few hours making this optimization practical.

From the foregoing it can be appreciated that the inventive method is ideally suited as a "productivity and performance tool" for MapReduce that will serve as a product differentiator for server clusters. The inventive method can be used as a code preprocessor by developers and help in optimizing MapReduce/HADOOP applications for a given cluster configuration.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for compiler-guided optimization of MapReduce type applications, said method comprising the steps of:
   applying transformations and optimizations to JAVA bytecode of an original application by instrumenter which carries out static analysis to determine application properties depending on the optimization being performed and provides an output of optimized JAVA bytecode; and
   executing said application and analyzing generated trace and feeds information back into said instrumenter by a trace analyzer, said trace analyzer and instrumenter invoking each other iteratively and exchanging information through files;
   wherein an automatic compiler transformation for a MapReduce data tiling optimization of said optimizations is completely independent of a body of map and reduce and applied to iterative convergence processes;
   wherein said optimizations comprises a parameter auto-tuning optimization employing a parameter instrumenter, a trace instrumenter and said trace analyzer, said trace instrumenter being for instrumenting JAVA bytecode of said application for selective trace generation, said parameter instrumenter being for adding statements in said JAVA bytecode for setting parameter values, and said trace analyzer being for executing said application with a fixed set of parameters and measuring execution time.

2. The method of claim 1, wherein said transformation comprises:
   making use of a close function in HADOOP, which is invoked once at the end of every map task, said map task invoking a map function multiple times once for each key/value pair in an input data set;
   moving a body of an original map function to map2, a new map function map2, that only stores the incoming key/value pairs in a list;
   introducing a new method called map_wrapper which invokes said map2 on the key/value pairs stored in the list iteratively;
   introducing a loop in said close function, which invokes said map_wrapper and reduce inside a loop;
   defining a new class called MyOutputCollector, which inherits from a HADOOP's OutputCollector and mimics its behavior by defining a hashtable for storing the key/value pairs; and
   passing an object of MyOutputCollector as a parameter to reduce inside said loop, instead of passing an object of OutputCollector as a parameter to reduce inside said loop.

3. The method of claim 1, wherein said automatic compiler transformation accumulates an input data set and then applies a map function to multiple key/value pairs at a time, said MapReduce data tiling optimization working correctly when multiple data elements are processed per map-reduce in the inner loop so that intermediate results obtained from data points in said data set are robust.

4. The method of claim 1, wherein automatic compiler transformation is generic and does not require any explicit preprocessing of an input data set.

5. The method of claim 2, wherein said map_wrapper is a behavioral equivalent of said original map function, except that it works on multiple key/value pairs at a time.

6. The method of claim 1, wherein said automatic compiler transformation requiring a using a compiler flag -approximate to indicate that an application follows an iterative convergence model and that a certain loss of accuracy in said output is acceptable, in order to trigger said optimization.

7. The method of claim 1, wherein said trace analyzer is responsible for enforcing correctness by comparing results of an optimized version with that of a non-optimized version.

8. The method of claim 1, wherein said data tiling optimization comprises one or two iterations of an outer while loop being peeled and said data tiling optimization is applied to a remainder loop followed by optimized logic for remaining iterations until a convergence criterion is met enabling an accuracy of a final result that is potentially better than an accuracy of a result obtained with data tiling alone.

9. The method of claim 1, wherein said parameter tuning optimization comprises finding optimal values for a set of parameters such that performance of said application is maximized and said trace analyzer comprises defining a range and increment for each parameter in order to define a search space.

10. The method of claim 1, wherein said parameter tuning optimization comprises identifying subsets of parameters that can be searched independently to enable a search space to be broken down into smaller search subspaces, a search to be performed independently on each subspace and a final result to be obtained by composing results of said search performed on each subspace.

* * * * *